United States Patent
Devereux et al.

(10) Patent No.: US 7,682,520 B2
(45) Date of Patent: Mar. 23, 2010

(54) COMPOSITION AND METHOD FOR CHELATED SCAVENGING COMPOUNDS

(75) Inventors: Thomas William Anthony Devereux, Edmonton (CA); Colin Adrian Woodman, Edmonton (CA)

(73) Assignee: Diversified Industries Ltd., Red Deer (CA)

( * ) Notice: Subject to any disclaimer, the term of this patent is extended or adjusted under 35 U.S.C. 154(b) by 59 days.

(21) Appl. No.: 11/837,251

(22) Filed: Aug. 10, 2007

(65) Prior Publication Data

US 2008/0039344 A1 Feb. 14, 2008

Related U.S. Application Data

(60) Provisional application No. 60/822,052, filed on Aug. 10, 2006.

(51) Int. Cl.
 *C09K 3/00* (2006.01)
(52) U.S. Cl. .............. 252/182.11; 252/182.12; 252/182.31; 252/183.11; 252/183.13
(58) Field of Classification Search ............ 423/220, 423/226, 227, 228, 229, 242.1, 242.2, 242.3, 423/242.7, 243.01, 243.07; 252/182.11, 252/182.12, 182.31, 183.11, 183.13; 208/208 R, 208/226, 236, 237
See application file for complete search history.

(56) References Cited

U.S. PATENT DOCUMENTS

| | | | |
|---|---|---|---|
| 2,859,176 A * | 11/1958 | Fairchild et al. ............ 208/234 |
| 4,007,262 A | 2/1977 | Bowers | |
| 4,643,886 A * | 2/1987 | Chang et al. ................. 423/226 |
| 4,824,645 A * | 4/1989 | Jones et al. .................. 423/226 |
| 4,859,436 A * | 8/1989 | Olson et al. .................. 423/221 |
| 5,149,460 A * | 9/1992 | Olson et al. .................. 252/191 |
| 5,174,973 A | 12/1992 | Smith et al. | |
| 5,219,542 A | 6/1993 | Lowery et al. | |
| 5,231,063 A | 7/1993 | Fukumoto et al. | |
| 5,395,585 A | 3/1995 | Goldstein | |
| 5,616,306 A * | 4/1997 | Mazgarov et al. ........... 423/228 |
| 5,688,478 A | 11/1997 | Pounds et al. | |
| 5,700,438 A | 12/1997 | Miller | |
| 5,705,135 A | 1/1998 | Deberry et al. | |
| 6,432,375 B1 | 8/2002 | Dalla Lana et al. | |
| 6,531,103 B1 * | 3/2003 | Hakka et al. ............. 423/242.2 |
| 7,459,012 B2 * | 12/2008 | Davis et al. .................... 95/235 |
| 2002/0130062 A1 * | 9/2002 | Wismann et al. ............ 208/189 |
| 2004/0241068 A1 * | 12/2004 | Hesse et al. ................. 423/226 |

FOREIGN PATENT DOCUMENTS

EP 0 882 485 A2 12/1998

OTHER PUBLICATIONS

Derwent Publications Ltd., London, GB; AN 1995-183809 XP002239658 & RU 2 021 004 C (Belo Kirova Techn. Inst. (BEKI)), Oct. 15, 1995 abstract.

* cited by examiner

*Primary Examiner*—Timothy C Vanoy
(74) *Attorney, Agent, or Firm*—Bennett Jones LLP

(57) ABSTRACT

There is disclosed herein a composition and method for removing a sulphur compound or carbon dioxide from a substance and methods for its use, said composition comprising a metal at between about 0.5 to 25 percent by weight, a base at between about 1 to 99 percent by volume, a chelating agent at between about 0.1 to 50 percent by weight and water.

21 Claims, 1 Drawing Sheet

A.

B.

A.

B.

US 7,682,520 B2

COMPOSITION AND METHOD FOR CHELATED SCAVENGING COMPOUNDS

CROSS REFERENCE TO RELATED APPLICATION

This application claims priority to U.S. provisional patent application No. 60/822,052 filed Aug. 10, 2006.

FIELD OF THE INVENTION

This invention relates to a composition and method that may be used in removing sulphur compounds and carbon dioxide from a substance.

BACKGROUND OF THE INVENTION

Hydrogen sulphide is a colorless gas, with an odor of rotten eggs. It is produced by bacterial action during the decay of both plant and animal protein and may be formed wherever elemental sulphur or certain sulphur-containing compounds come into contact with organic materials at high temperatures. In industry, it is usually an unintended byproduct, for example from the production of coke from sulphur-containing coal, from the refining of sulphur-containing crude oils, the production of disulphide, the manufacture of viscose rayon, and in the Kraft process for wood pulp.

Hydrogen sulphide is also a byproduct of wastewater from treatment plants or water from agricultural practices. Additionally, hydrogen sulphide may be responsible for the unpleasant odor from liquids used in janitorial processes, RV holding tanks, portable toilets and the like. If the emission of hydrogen sulphide from these liquids may be controlled, then the unpleasant odors may be eliminated.

Hydrogen sulphide is toxic to humans and other animals, and represents a significant threat to public safety and health. It can cause serious health risks and fatalities, most notably in the oil and gas, livestock, waste management and janitorial industries.

Natural gases and oils with high concentrations of hydrogen sulphide are known as "sour" and the hydrogen sulphide in sour gas and oil streams is separated using a "sweetening" process.

Many chemical compositions are used as absorption agents in sweetening processes; these include caustic soda, ammonia and amines. Gas and oil streams with high daily flows of hydrogen sulphide and other sulphur contaminants are typically treated in sweetening processes that, for economic reasons, regenerate the chemical solvents after they have absorbed the sulphur contaminants from the process stream. When the daily sulphur flow is low, it is usually uneconomic to employ a regenerative process and the sulphur compounds are removed with treatment chemicals know as "scavengers" which absorb hydrogen sulphide and other compounds from the process stream and bind these compounds in the "spent" scavenger which is removed to a safe disposal site.

There are many scavengers used in industry but all suffer from disadvantages.

A scavenger intended for controlling hydrogen sulphide in oil drilling is described in U.S. Pat. No. 4,147,212. While this formulation removes hydrogen sulphide from gas streams and liquid streams, when the scavenger is diluted with water, the zinc component of the scavenging agent is precipitated from solution, thereby limiting the desirability of this scavenger in many industrial applications. As a solid precipitate, the zinc component can settle out from solution and no longer have any activity within the composition.

There is a need for a simple, economical and effective means of removing sulphur compounds and carbon dioxide present in substances, while preventing the problem of precipitation from the scavenger prior to reacting with the sulphur compounds or carbon dioxide.

SUMMARY OF THE INVENTION

This invention provides a composition and method for removing sulphur compounds from a substance which includes fluids such as gases and liquids. The composition and methods of this invention may also be used to remove carbon dioxide from a substance.

Accordingly, in one aspect of the invention, is a composition for removing a sulphur compound or carbon dioxide from a substance, said composition comprising:
(a) a metal, at between about 0.05 to 25 percent by weight of the composition;
(b) a base, at between about 1 to 99 percent by volume of the composition;
(c) a chelating agent, at between 0.1 to 50 percent by weight of the composition; and
(d) water In another aspect, this invention is a method of removing a sulphur compound or carbon dioxide from substance, which method comprises:
(a) preparing a composition according to one aspect of this invention; and
(b) contacting the substance with the composition.

In another aspect, this invention is a method of removing a sulphur compound or carbon dioxide from a gas or a liquid, which method comprises:
(a) preparing a composition according to one aspect of this invention; and
(b) contacting the substance with the composition.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION

Figure 1:
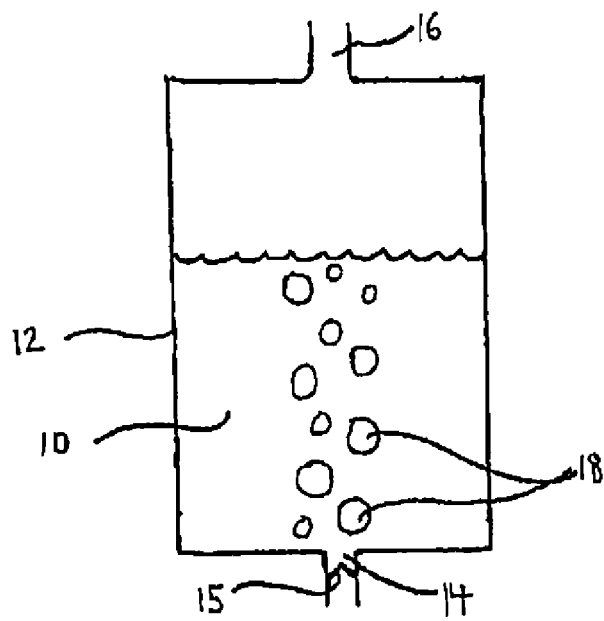
FIG. 1A is a drawing of an apparatus used in the method of this invention.
FIG. 1B is a drawing of an apparatus used in an alternate method of this invention.
Figure 1:
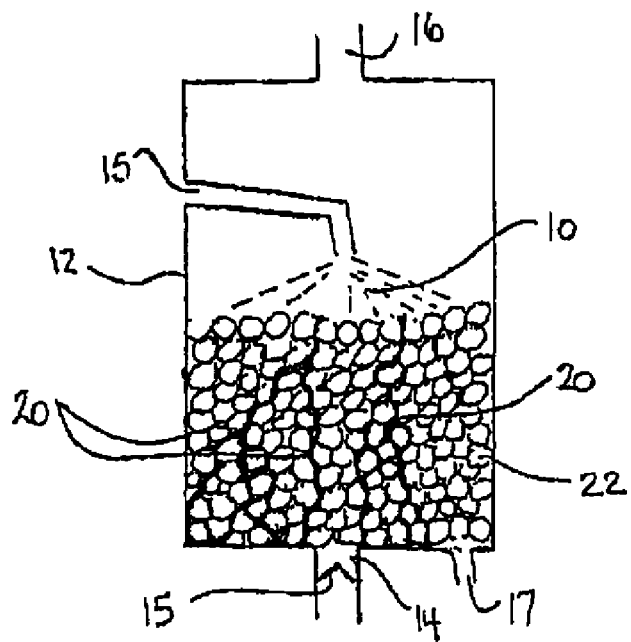

There is disclosed herein a composition that may be used to remove a sulphur compound or carbon dioxide from a substance. In one embodiment, it may be used to remove sulphur compounds from natural gas or liquid hydrocarbons collected from oil and gas wells. "Sulphur compound" as used herein may include hydrogen sulphide, methyl mercaptan and ethyl mercaptan.

The composition of this invention is a mixture of a metal, a base, a chelating agent and water. However, this invention is not intended to be limited by the chemicals used in the examples below.

The metal component of the composition may comprise between about 0.05 to 25 percent by weight of the composition, and may exist as a metal ion in the composition. In one embodiment, the metal component may be copper. In another embodiment the metal component may be zinc. In yet another embodiment the metal component may be iron, or manganese. In yet another embodiment, the metal component may be a mixture of any of the above metals. The metals may be added as metal salts or oxides.

For example, in one embodiment, where zinc is used as the metal component, the amount of zinc in the composition may be between about 1 to 15 percent by weight. In another example, where copper is used as the metal component, the amount of copper in the composition may be between about 1 to 15 percent by weight.

The base component of the composition may range between about 1 to 99 percent by volume of the composition. In another embodiment of the composition, the base component may range between about 1 to 80 percent by volume of the composition.

The base component of the composition may be added as an essentially pure liquid of the base or a solution of mixed bases. In one embodiment, the base component may be ammonium hydroxide. In another embodiment, the base may be monoethanolamine.

The chelating agent of the composition may range between about 0.1 to 50 percent by weight of the composition. Chelate, as used herein means the process that traps and binds certain metal ions to hold them in suspension. "Chelating agent" as used herein refers to a compound that can chelate metal ions.

In one embodiment of the invention, the chelating agent may be an organic acid or salt of an organic acid. For example, in one embodiment, the chelating agent may be citric acid. In another embodiment, the chelating agent may be a salt of citric acid, including zinc citrate, ammonium citrate, aluminum citrate, iron citrate, magnesium citrate, potassium citrate and sodium citrate. In another embodiment of the invention, the chelating agent may be tartaric acid. In yet another embodiment, the chelating agent may be a salt of tartaric acid, including zinc tartrate, ammonium tartrate, aluminum tartrate, iron tartrate, magnesium tartrate, potassium tartrate and sodium tartrate.

Another component of the composition of this invention is water. Water may be used to bring the volume of the composition to its desired final volume, or which may already be provided by other components of the composition. One embodiment comprises water at a final volume percentage of between 1 to 98 percent of the final volume of the composition.

In an alternative embodiment, an ammonium salt may be further be added to the composition. The ammonium salt component of the composition may range between about 0 to 50 percent by weight of the composition. In one embodiment, the ammonium salt may be ammonium carbonate. In another embodiment the ammonium salt may be ammonium sulphate. In yet another embodiment, the ammonium salt may be ammonium citrate.

In another alternative embodiment, an anti-freeze agent may be further added to the composition. The anti-freeze agent component of the composition may range between about 0 to 50 percent by volume of the composition. In one embodiment, the anti-freeze agent is ethylene glycol. In another embodiment, the anti-freeze agent may be methanol. In one embodiment, the methanol component may range from between about 5% to 50% by volume of the composition.

Having thus disclosed the various components of the composition, an example of how the composition is prepared will now be disclosed. However, this invention is not intended to be limited by the order or method in which the components are mixed together, unless the components cannot be mixed in that order, or by that method, to provide the composition that is disclosed herein. Additionally, this invention is not intended to be limited by the chemicals used in the examples below.

The composition of this invention may be made by dissolving the chelating agent in water and then adding to the mixture, the metal, as either a solid salt or salt in solution. The base component may then be added.

Alternatively, the base component and the chelating agent may be mixed together. The metal may then be added and mixed thereto.

Alternatively, the composition may be made by dissolving the chelating agent in water and then adding the base. The metal component may then be added.

In an alternative embodiment further comprising an ammonium salt in the composition, the ammonium salt may be added to the base prior to reaction with the chelating agent. Alternatively, the ammonium salt may be added to the composition after all the components are mixed.

In one embodiment, the composition comprises about 25 g of citric acid, 12.4 g of ZnO, 100 ml of 30% ammonium hydroxide.

In another embodiment, the composition comprises about 30 g of citric acid, 12.4 g of ZnO, 100 ml of 30% ammonium hydroxide.

In another embodiment, the composition comprises about 21 g of citric acid, 8.14 g of ZnO, 49 ml of 30% ammonium hydroxide and 100 ml water.

In another embodiment, the composition comprises about 16.3 g citric acid, 8 g of ZnO, 100 ml of 30% ammonium hydroxide.

In another embodiment, the composition comprises about 8.13 g of citric acid, 4 g of ZnO, 100 ml of 30% ammonium hydroxide.

In another embodiment, the composition comprises about 32 g of zinc citrate, 100 ml of 30% ammonium hydroxide.

In another embodiment, the composition comprises about 11 g of citric acid, 8 g of ZnO and 100 ml of 30% ammonium hydroxide.

In another embodiment, the composition comprises about 5 g of citric acid, 4 g of ZnO and 100 ml of 30% ammonium hydroxide solution.

In another embodiment, the composition comprises about 30 g of citric acid, 12.3 g of ZnO, 43.3 ml of 30% ammonium hydroxide and 56.7 ml of water.

In another embodiment, the composition comprises about 11 g of citric acid, 8 g of ZnO, 100 ml of 30% ammonium hydroxide solution and 10 g of ammonium carbonate.

In another embodiment, the composition comprises about 10 g of citric acid, 13 ml of a 62.5 zinc chloride solution, 52 ml of monoethanolamine, (known as "MEA"), and 33.1 ml of water.

In another embodiment, the composition comprises about 20 g of citric acid, 11.3 g of zinc sulfate monohydrate, 52 ml of MEA and 47.3 ml of water.

In another embodiment, the composition comprises about 5 g of citric acid, 11.3 g of zinc sulfate monohydrate, 52 ml of MEA and 47.3 ml of water.

In another embodiment, the composition comprises about 10 g of citric acid, 11.3 g of zinc sulfate monohydrate, 26 ml of MEA and 73.3 ml of water.

In another embodiment, the composition comprises about 10 g of citric acid, 11.3 g of zinc sulfate monohydrate, 33 ml of MEA, 46.3 ml of water and 20 ml of ethylene glycol.

In another embodiment, the composition comprises about 10 g of citric acid, 11.3 g of zinc sulfate monohydrate, 46.3 ml of MEA, 47.3 ml of water and 20 ml of methanol.

In another embodiment, the composition comprises about 10 g of citric acid, 16 g of zinc oxide, 33 ml of MEA and 66.3 ml of water.

In another embodiment, the composition comprises about 20 g of citric acid, 11.3 g of zinc sulfate monohydrate, 52 ml of MEA and 47.3 ml of water.

Having thus disclosed the composition of this invention and examples as to how it may be prepared, the methods for using the composition will now be disclosed. One method of this invention is to prepare the composition as described, and then to bring the composition into contact with a substance that contains a sulphur containing compound. The substance may be a fluid such as a gas or a liquid. As used herein, "gas" can mean a form of matter that has no fixed volume and will conform in volume to the space available, and is intended to include mixtures of gases, such as air.

For example, the gas may be natural gas that contains hydrogen sulphide, it may be air that contains hydrogen sulphide, and which is emitted from wastewater or from agricultural operations, RV holding tanks, or portable toilets, for example. The composition will, upon contact with the hydrogen sulphide-containing gas or air, remove all or a significant portion of, the hydrogen sulphide. Without being limited to a theory, the hydrogen sulphide reacts with the copper, zinc or iron in the composition to form cupric, zinc or iron sulphide, respectively, which are insoluble molecules that precipitate out of the composition.

Alternatively or in addition to hydrogen sulphide, a gas that is used in the methods of this invention may comprise other sulphur compounds. For example, the gas may comprise mercaptans such as methyl mercaptan and ethyl mercaptan. The composition will, upon contact with a gas comprising one or more of these sulphur compounds, remove all or a significant portion of these other sulphur compounds from the gas.

Alternatively or in addition, a gas that is used in the methods of this invention may comprise carbon dioxide. The composition of this invention will, upon contact with a gas comprising carbon dioxide, remove a significant portion or all of the carbon dioxide from the gas. This removal appears to be most efficient at cold temperatures. The composition also appears to have some effect on nitrogen levels.

The composition may be used to remove gaseous sulphur compounds and carbon dioxide from gases, a process known as "gas scrubbing." FIG. 1A shows one embodiment of the method of this invention in which a gas comprising one or more compounds that are to be removed from the gas is bubbled through a composition of the invention. Examples of the compounds that are to be removed from the gas include, hydrogen sulphide, mercaptans, such as methyl mercaptan or ethyl mercaptan, and carbon dioxide. As seen in FIG. 1, composition 10 is placed into a container 12 that has an entrance opening 14 and an exit opening 16. Entrance opening is fitted with a device 15, such as a one-way valve, that will prevent composition 10 from running out of container 12. The gas 18 enters container 12 through entrance opening 14 and passes through composition 10 by rising upwards because of its low density. Gas 18 exits container 12 through exit opening 16.

As is apparent, the gas 18 moves through composition 10 as a series of bubbles, which increases the surface area of the interaction between composition 10 and gas 18, and causes turbulence in composition 10, both of which increase the efficiency of removal of the desired compounds from gas 18.

FIG. 1B shows another embodiment of the method of this invention, in which composition 10 is passed through tortuous paths 20 in container 12, rather than simply being introduced into container 12 as a volume of liquid. In the method of this embodiment, container 12 again comprises entrance opening 14 and exit opening 16 through which a gas 18 will enter into and exit from container 12. These openings are positioned such that gas 18 must pass through the tortuous paths 20 after entering and before exiting container 12. Additionally, container 12 comprises an opening 15 and an exit 17, through which composition 10 will enter and exit container 12, which are positioned such that composition 10 must pass through the tortuous paths 20 after entering and before exiting container 12. As is apparent, the tortuous paths both increase contact of composition 10 with gas 18, and also provide turbulence to composition 10, both of which increase the efficiency of removal of the compounds from gas 18.

FIG. 1B demonstrates an embodiment of this invention in which the tortuous path is created by introducing a plurality of objects 22, such as small circular balls or "raschig rings", into container 12. In one embodiment, these balls are approximately the size of a golf ball. However, balls of different or varying sizes, objects that are not round, but oval or discoid, objects that have rounded and flat edges, or objects with flat edges may be used. Any objects that would function to cause composition 10 and gas 18 to travel around and between them, are intended to be included herein. These objects function to increase the surface area of interaction between the composition 10 and gas 18.

In this embodiment of the method of this invention, composition 10 is introduced into container 12, in such a way that maximizes its contact with the surface of the objects 22. As demonstrated in FIG. 1B, this may be accomplished by spraying composition 10 over the top surface of the objects, whereafter it will trickle down through the various tortuous paths.

Container 12 may be adapted to collect the gas that exits through exit opening 16, for example to collect natural gas. Alternatively, if the gas 18 is not to be collected, such as after the compounds have been removed from gases emitting from wastewater or from water used in agricultural operations, the gas would be released directly into the atmosphere, presuming it is otherwise clean.

In yet another embodiment of the method of this invention, the composition is mixed with water and misted into a vessel containing gaseous sulphur compounds and carbon dioxide.

In yet another embodiment of this method that is used with steam injection, the composition is injected into steam to react with any sulphur compounds and carbon dioxide that might be in the atmosphere as well as react with any liquids that might be within the tank.

In yet another embodiment of this method, the composition is merely injected into a container comprising a gas and the contact between the composition and the gas removes the gaseous sulphur compounds and carbon dioxide from the gas.

The composition may also be used to remove sulphur compounds and carbon dioxide from liquids. As used herein, a "liquid" may mean any liquid substance including a fracturing fluid, drilling mud, a liquid hydrocarbon, or a mixture of water and hydrocarbons. Therefore, another embodiment of the method of this invention is to prepare the composition as described, and then to mix the composition with another liquid that contains one or more of hydrogen sulphide, mercaptans, such as methyl mercaptan and ethyl mercaptan, or carbon dioxide. When the composition and the liquid are mixed, and without being limited to a theory, the sulphur compounds in the liquid will react with the metal in the composition to form a metal sulphide, an insoluble molecule that precipitates out of the composition. This precipitate may be removed from the mixture, for example by filtration or centrifugation. Alternatively, removal of the precipitate may not be necessary, for instance in a situation where the liquid is a drilling fluid used in oil and gas well drilling.

For example, the composition may be used to reduce or eliminate sulphur compounds in liquid hydrocarbons by injecting the composition into the hydrocarbon and ensuring subsequent mixing of the composition with the hydrocarbon. This be accomplished, for example, by using an injection pump to add the composition to the hydrocarbon contained in a pipeline. A specific example would be injection of the composition into the flowline of an oil producing well, or directly down into the well through the casing. Treatment of a liquid with the composition may also be accomplished by adding the composition to tanks containing the liquid. For example, the composition may be added to the contents of truck tankers or tanker ships. Liquid hydrocarbons that may be treated in this manner include crude oils, natural gas condensates, liquefied petroleum gas and refined products such as fuel oils.

In yet another embodiment, drilling mud is mixed with the composition of this invention, in order to remove therefrom a number of compounds including, hydrogen sulphide, mercaptans such as methyl mercaptan and ethyl mercaptan, or carbon dioxide.

The composition may also be used to reduce or eliminate sulphur compounds in water, known as "sour water", which contains hydrogen sulphide and mercaptans. The composition may also be used to eliminate odours arising from liquids, since the source of many odours is sulphur compounds, which would be removed by the composition. The composition may therefore be applied to odorous waters, such as at waste treatment plants.

As will be apparent to those skilled in the art, various modifications, adaptations and variations of the preceding and foregoing specific disclosure may be made without departing from the scope of the invention claimed herein. The following examples are intended only to illustrate and describe the invention rather than limit the claims that follow.

EXAMPLES

Test 1: No Chelating Agent 100 ml of a 6% ammonium hydroxide solution was measured. To this was added 20 g of ammonium carbonate which was mixed until dissolved. 12.4 g of zinc oxide was added and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$. 99% nitrogen was bubbled through the solution. The effluent gas was monitored for $H_2S$ and the run was judged complete when effluent $H_2S$ reached 10 ppm. The capacity of the solution to absorb $H_2S$ was calculated as 53.9 g/liter of scavenger.

Samples were prepared of scavenger diluted with water. The ratios ranged from 75 scavenger/25 water, to 1 scavenger/99 water. In all diluted samples a white precipitate developed.

Test 2: Citric Acid as Chelating Agent 21.0 g of citric acid was dissolved in 100 ml of water. 8.14 g of zinc oxide was added and mixed until dissolved. 49 ml of 30% ammonium hydroxide was added and a further 4.2 g of zinc oxide was dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run was judged complete when effluent $H_2S$ reached 10 ppm. The capacity of the solution to absorb $H_2S$ was calculated as 31.8 g/liter of scavenger.

Samples were prepared of scavenger diluted with water. The ratios ranged from 75 scavenger/25 water, to 1 scavenger/99 water. In all diluted samples, no precipitate developed.

Test 3: Citric Acid as Chelating Agent 100 ml of a 30% ammonium hydroxide solution was measured. To this was added 30 g of citric acid which was mixed until dissolved. 12.4 g of zinc oxide was added and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 65.5 g/liter of scavenger.

Samples were prepared of scavenger diluted with water. The ratio ranged from 75 scavenger/25 water, to 1 scavenger/99 water. In all diluted samples, no precipitate developed.

Test 4: Citric Acid as Chelating Agent 100 ml of a 30% ammonium hydroxide solution was measured. To this was added 25 g of citric acid which was mixed until dissolved. 12.4 g of zinc oxide was added and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 69 g/liter of scavenger.

Samples were prepared of scavenger diluted with water. The ratios ranged from 75 scavenger/25 water, to 1 scavenger/99 water. In all diluted samples, no precipitate developed Test 5: Citric Acid as Chelating Agent 100 ml of a 30% ammonium hydroxide solution was measured. To this was added 16.3 g of citric acid which was mixed until dissolved. 8 g of zinc oxide was added and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 53 g/liter of scavenger.

Samples were prepared of scavenger diluted with water. The ratios ranged from 75 scavenger/25 water, to 1 scavenger/99 water. In all diluted samples, no precipitate developed.

Test 6: Citric Acid as Chelating Agent 100 ml of a 30% ammonium hydroxide solution was measured. To this was added 8.13 g of citric acid which was mixed until dissolved. 4 g of zinc oxide was added and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ is yet to be determined but will approximately be 30 g/liter of scavenger.

Samples were prepared of scavenger diluted with water. The ratios ranged from 75 scavenger/25 water, to 1 scavenger/99 water. In all diluted samples, no precipitate developed.

Test 7: Zinc Citrate as Chelating Agent 100 ml of a 30% ammonium hydroxide solution was measured. To this was added 32 g of zinc citrate and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 71.7 g/liter of scavenger.

Samples were prepared of scavenger diluted with water. The ratios ranged from 75 scavenger/25 water, to 1 scavenger/99 water. In all diluted samples, no precipitate developed.

Test 8: Citric Acid as Chelating Agent 100 ml of a 30% ammonium hydroxide solution was measured. To this was added 11 g of citric acid which was mixed until dissolved. 8 g of zinc oxide was added and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 55 g/liter of scavenger.

Samples were prepared of scavenger diluted with water. The ratios ranged from 75 scavenger/25 water, to 1 scavenger/99 water. In all diluted samples, no precipitate was developed.

Test 9: Citric Acid as Chelating Agent 100 ml of 30% ammonium hydroxide solution was measured. To this was added 5.53 g of citric acid which was mixed until dissolved. 4 g of zinc oxide was added and mixed until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent calculated $H_2S$ reached 10 ppm. The capacity of the solution to absorb $H_2S$ was calculated as 30 g/liter of scavenger.

Samples were prepared of scavenger diluted with water. The ratios ranged from 75 scavenger/25 water, to 1 scavenger/99 water. In all diluted samples, no precipitate developed.

Test 10: Citric Acid as Chelating Agent

Measure of 30 g of citric acid and dissolve into 56.7 ml of deionized water. Add 12.3 g of ZnO to the solution and mix until dissolved. Add 43.3 ml of 30% ammonium hydroxide and mix, using an ice bath to keep the solution cool. A water clear solution was obtained.

The solution was tested fir $H_2S$ absorption capacity. 20 ml of solution was poured into a 2 cm diameter glass column, about 80 cm high. A gas stream of composition 1% $H_2S$. 99% nitrogen was bubbled through the solution. The effluent gas was monitored for $H_2S$ and the run judged complete when effluent $H_2S$ reached 10 ppm. The capacity of the solution to absorb $H_2S$ was calculated as 60 g/liter of scavenger.

Samples were prepared of scavenger diluted with water. The ratios ranged from 75 scavenger/25 water, to 1 scavenger/99 water. In all diluted samples, no precipitate developed.

Test 11: Citric Acid as Chelating Agent, with Ammonium Salt

Measure 11 g of citric acid and add slowly into 100 ml of ammonium hydroxide and mix until dissolved. Add 8 g of ZnO and mix until dissolved. Add 10 g of ammonium carbonate slowly and mix until dissolved. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 50 g per liter of scavenger.

Samples were prepared of scavenger diluted with water. The ratios ranged from 75 scavenger/25 water, to 1 scavenger/99 water. In all diluted samples, no precipitate developed.

Test 12: Citric Acid as Chelating Agent, with Monoethanolamine

Measure 11 g of citric acid and add slowly into 33.1 ml of water and mix until dissolved. Add 11.3 g of zinc sulfate monohydrate and mix until dissolved. Add 14.2 ml more water. Slowly add mixture to 52 ml of monoethanolamine. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 28 g per liter of scavenger.

Samples were prepared of scavenger diluted with water. The ratios ranged from 75 scavenger/25 water, to 1 scavenger/99 water. In all diluted samples, no precipitate developed.

Test 13: Citric Acid as Chelating Agent, with Monoethanolamine

Measure 20 g of citric acid and add slowly into 33.1 ml of water and mix until dissolved. Add 11.3 g of zinc sulfate monohydrate and mix until dissolved. Add 14.2 ml more water. Slowly add mixture to 52 ml of monoethanolamine. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 25.5 g per liter of scavenger.

Samples were prepared of scavenger diluted with water. The ratios ranged from 75 scavenger/25 water, to 1 scavenger/99 water. In all diluted samples, no precipitate developed.

Test 14: Citric Acid as Chelating Agent, with Monoethanolamine

Measure 5 g of citric acid and add slowly into 33.1 ml of water and mix until dissolved. Add 11.3 g of zinc sulfate monohydrate and mix until dissolved. Add 14.2 ml more water. Slowly add mixture to 52 ml of monoethanolamine. A water clear solution was obtained.

The solution was tested for $H_2S$ absorption capacity. 20 ml of solution was poured into a 2 cm diameter glass column, about 80 cm high. A gas stream of composition 1% $H_2S$. 99% nitrogen was bubbled through the solution. The effluent gas was monitored for $H_2S$ and the run judged complete when effluent $H_2S$ reached 10 ppm. The capacity of the solution to absorb $H_2S$ was calculated as 33.5 g per liter of scavenger.

Samples were prepared of scavenger diluted with water. The ratios ranged from 75 scavenger/25 water, to 1 scavenger/99 water. In all dilutions, no precipitate formed.

Test 15: Citric Acid as Chelating Agent, with Monoethanolamine

Measure 10 g of citric acid and add slowly into 59.1 ml of water and mix until dissolved. Add 11.3 g of zinc sulfate monohydrate and mix until dissolved. Add 14.2 ml more water. Slowly add mixture to 26 ml of monoethanolamine. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 28.5 g per liter of scavenger.

Samples were prepared of scavenger diluted with water. The ratios ranged from 75 scavenger/25 water, to 1 scavenger/99 water. In all diluted samples, no precipitate developed.

Test 16: Citric Acid as Chelating Agent, with Monoethanolamine and Ethylene Glycol 46.3 ml of water was added to 33 ml of monoethanolamine. 20 ml of Ethylene glycol, 10 g of citric acid and 11.3 g of zinc sulfate monohydrate were added sequentially, mixing between each addition. A water clear solution was obtained.

The solution was tested for $H_2S$ absorption capacity. 20 ml of solution was poured into a 2 cm diameter glass column, about 80 cm high. A gas stream of composition 1% $H_2S$. 99% nitrogen was bubbled through the solution. The effluent gas was monitored for $H_2S$ and the run judged complete when effluent $H_2S$ reached 10 ppm. The capacity of the solution to absorb $H_2S$ was calculated as 28.0 g per liter of scavenger.

Samples were prepared of scavenger diluted with water. The ratios ranged from 75 scavenger/25 water, to 1 scavenger/99 water. In all diluted samples, no precipitate developed.

Test 17: Citric Acid as Chelating Agent, with Monoethanolamine and Methanol 46.3 ml of water was added to 33 ml of monoethanolamine. 20 ml of methanol, 10 g of citric acid and 11.3 g of zinc sulfate monohydrate were added sequentially, mixing between each addition. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 26 g per liter of scavenger.

Samples were prepared of scavenger diluted with water. The ratios ranged from 75 scavenger/25 water, to 1 scavenger/99 water. In all diluted samples, no precipitate developed.

Test 18: Citric Acid as Chelating Agent 66.3 ml of water was added to 33 ml of monoethanolamine, 10 g of citric acid and 16.0 g of zinc sulfate monohydrate were added sequentially, mixing between each addition. A water clear solution was obtained.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 42.5 g per liter of scavenger.

Samples were prepared of scavenger diluted with water. The ratios ranged from 75 scavenger/25 water, to 1 scavenger/99 water. In all diluted samples, no precipitate developed.

Test 19: Zinc Citrate as Chelating Agent

Zinc citrate dehydrate (13.7 g) was added slowly to water. The mixture was added to monoethanolamine (52 ml). A water clear solution was obtained after standing.

The solution was tested for $H_2S$ absorption capacity. 20 ml of solution was poured into a 2 cm diameter glass column, about 80 cm high. A gas stream of composition 1% $H_2S$, 99% nitrogen was bubbled through the solution. The effluent gas was monitored for $H_2S$ and the run judged complete when effluent $H_2S$ reached 10 ppm. The capacity of the solution to absorb $H_2S$ was calculated as 38.0 g per liter of scavenger.

Samples were prepared of scavenger diluted with water. The ratios ranged from 75 scavenger/25 water, to 1 scavenger/99 water. In all diluted samples, no precipitate developed.

We claim:

1. A composition for removing a sulphur compound and/or carbon dioxide from a fluid, said composition comprising:
    (a) a metal, at between about 0.05 to 25 percent by weight of the composition;
    (b) a base, at between about 1 to 99 percent by volume of the composition;
    (c) a chelating agent between about 0.1 to 50% by weight of the composition;
    (d) water; and
    (e) an antifreeze agent at no more than 50% by volume of the composition.

2. The composition of claim 1 wherein the sulphur compound is selected from a group consisting of: hydrogen sulphide, methyl mercaptan and ethyl mercaptan.

3. The composition of claim 1 wherein the metal is selected from a group consisting of: copper, zinc, iron, magnesium and manganese.

4. The composition of claim 1 wherein the metal is copper.

5. The composition of claim 1 wherein the metal is zinc.

6. The composition of claim 1 wherein the metal is present at between about 1 to 15 percent by weight of the composition.

7. The composition of claim 1 wherein the base is ammonium hydroxide.

8. The composition of claim 1 wherein the base is monoethanolamine.

9. The composition of claim 1 wherein the base is present between about 5 to 80 percent by volume of the composition.

10. The composition of claim 1 wherein the chelating agent is citric acid.

11. The composition of claim 1 wherein the chelating agent is a salt of citric acid.

12. The composition of claim 11 wherein the salt of citric acid is zinc citrate.

13. The composition of claim 1 wherein the chelating agent is tartaric acid.

14. The composition of claim 1 wherein the chelating agent is a salt of tartaric acid.

15. The composition of claim 14 wherein the salt of tartaric acid is zinc tartrate.

16. The composition of claim 1 further comprising an ammonium salt at about between 0 to 50% by weight of the composition.

17. The composition of claim 16 wherein the ammonium salt is selected from a group consisting of ammonium carbonate, ammonium sulphate or ammonium citrate.

18. The composition of claim 1 wherein the antifreeze agent is ethylene glycol.

19. The composition of claim 18 wherein ethylene glycol is present at about 5 to 50% percent by volume of the composition.

20. The composition of claim 1 wherein the antifreeze agent is methanol.

21. The composition of claim 20 wherein methanol is present at about 5 to 50% percent by volume of the composition.

* * * * *